(12) United States Patent
Ryoo et al.

(10) Patent No.: US 8,929,201 B2
(45) Date of Patent: Jan. 6, 2015

(54) METHOD AND APPARATUS OF PERFORMING PROTECTION SWITCHING ON NETWORKS

(71) Applicant: Electronics and Telecommunications Research Institute, Daejeon (KR)

(72) Inventors: Jeong-dong Ryoo, Daejeon (KR); Taesik Cheung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 114 days.

(21) Appl. No.: 13/625,308

(22) Filed: Sep. 24, 2012

(65) Prior Publication Data

US 2013/0077479 A1 Mar. 28, 2013

(30) Foreign Application Priority Data

Sep. 22, 2011 (KR) .................. 10-2011-0095922
Sep. 21, 2012 (KR) .................. 10-2012-0104917

(51) Int. Cl.
*G01R 31/08* (2006.01)
*H04L 29/14* (2006.01)
*H04L 12/707* (2013.01)
*H04L 12/703* (2013.01)
*H04L 12/939* (2013.01)
*H04L 1/22* (2006.01)

(52) U.S. Cl.
CPC .............. *H04L 69/40* (2013.01); *H04L 45/22* (2013.01); *H04L 45/28* (2013.01); *H04L 49/557* (2013.01); *H04L 1/22* (2013.01)

USPC ............................................ 370/217; 370/225

(58) Field of Classification Search
None
See application file for complete search history.

(56) References Cited

U.S. PATENT DOCUMENTS

| | | | |
|---|---|---|---|
| 6,323,974 B1 * | 11/2001 | Harris et al. ...................... | 398/2 |
| 6,798,991 B1 * | 9/2004 | Davis et al. ..................... | 398/19 |
| 7,058,136 B1 * | 6/2006 | Hellberg et al. ............... | 375/295 |
| 8,103,161 B2 * | 1/2012 | Li ..................................... | 398/4 |
| 8,370,666 B2 * | 2/2013 | Dong et al. .................... | 713/323 |
| 8,670,305 B2 * | 3/2014 | Peng et al. ..................... | 370/225 |
| 2001/0017866 A1 | 8/2001 | Takada et al. | |
| 2005/0089027 A1 * | 4/2005 | Colton .......................... | 370/380 |
| 2010/0177630 A1 * | 7/2010 | He et al. ....................... | 370/217 |
| 2012/0147741 A1 * | 6/2012 | Wei ............................ | 370/225 |
| 2013/0077479 A1 * | 3/2013 | Ryoo et al. .................... | 370/225 |
| 2013/0083652 A1 * | 4/2013 | Cheung et al. ................ | 370/228 |
| 2013/0088976 A1 * | 4/2013 | Ao et al. ....................... | 370/242 |
| 2013/0128725 A1 * | 5/2013 | Maggiari ..................... | 370/225 |

* cited by examiner

*Primary Examiner* — Robert Wilson
(74) *Attorney, Agent, or Firm* — Nelson Mullins Riley & Scarborough LLP

(57) ABSTRACT

A protection switching unit and a method of performing protection switching of the protection switching unit are provided. The method includes steps of detecting a fault that has occurred at a working path of a network; opening a first switch that is connected to the working path and closing a second switch that is connected to the protection path of the network; and maintaining a connection state of the first switch and the working path and a connection state of the second switch and the protection path, when a fault that has occurred at the working path is restored.

14 Claims, 2 Drawing Sheets

METHOD AND APPARATUS OF PERFORMING PROTECTION SWITCHING ON NETWORKS

CROSS-REFERENCE TO RELATED APPLICATION

This application claims priority to and the benefit of Korean Patent Application Nos. 10-2011-0095922 and 10-2012-0104917 filed in the Korean Intellectual Property Office on Sep. 22, 2011 and Sep. 21, 2012, the entire contents of which are incorporated herein by reference.

BACKGROUND OF THE INVENTION (a) Field of the Invention

The present invention relates to a method and apparatus that performs protection switching on networks.

(b) Description of the Related Art

As a fault occurs at a working path that connects two end point nodes, when traffic transmission is stopped, protection switching is a method of continuing to transmit traffic between the two end point nodes using another path, called a protection path. Protection switching methods are divided into a linear protection switching method, a ring protection switching method, and a mesh protection switching method according to topology of a network.

In linear protection switching, for traffic that is transmitted in a bi-direction or uni-direction between two end points, a working path and a protection path are set to be disjointed. In principle, while traffic is being transmitted through a working path, a fault occurs at the working path or when an instruction of an operator to switch the traffic to protection path is input, traffic is transmitted to the protection path.

Ring protection switching is necessary in a ring network that is physical or logically formed. When a fault occurs at a link or a node of the ring network or when an instruction of an operator is input, traffic is transmitted through a protection path. In this case, operation methods of protection switching are different according to transfer technology of traffic, for example, Ethernet, a multiprotocol label switching (MPLS), and a multiprotocol label switching-transport profile (MPLS-TP).

Mesh protection switching sets a linear protection domain for a point-to-point connection when multiple point-to-point connections exist on a mesh topology network and enables a protection path of a plurality of linear protection domains to share the same network resource.

In various forms of protection switching methods such as linear, ring, or mesh, when traffic is injected into a network, at both end nodes (linear protection switching and mesh protection switching) of a point-to-point connection or at a node belonging to a ring (ring protection switching), a transmission path of traffic is determined according to whether a fault exists (or an operator instruction is input) at a working path or a protection path that can transmit traffic. In this case, a method in which a node selects a transmission path of traffic or an apparatus that performs such a function is generally a referred to as a bridge.

A standard that is related to protection switching is generally defined through several standard recommendations in an international telecommunication union (hereinafter, referred to as an 'ITU'), which is an international standard organization. An example of standard recommendations of the ITU is ITU-T G.870, G.808.1, G.873.1, G.8031, G.8032, G.8131, and G.8132, and a standardization organization such as Internet engineering task force (IETF) and the institute of electrical and electronics engineers (IEEE) has a plurality of protection switching related standards.

A bridge that is defined by the protection switching related standard includes a permanent bridge, a selector bridge, and a broadcast bridge.

The permanent bridge copies input traffic and always transmits the input traffic to a working path and a protection path regardless of a fault of a path. The selector bridge transmits traffic to a path having no fault according to whether a fault exists at a working path or a protection path. The broadcast bridge transmits traffic to only a working path, if a fault does not exist at the working path and copies traffic and transmits traffic to the working path and a protection path, if a fault occurs at the working path.

Generally, protection switching technology operates two ways, the first one is reverse mode (or revertive mode) that restores a state of switches that is connected to the working path after the fault is restored, and the other one is non-reverse mode (or non-revertive mode) that doesn't restore a state of the switches back to the working path after the fault is restored.

A fault of a path includes a signal failure (hereinafter, referred to as an 'SF') in which transfer of traffic is completely stopped and signal degrade (hereinafter, referred to as 'SD') in which traffic is partially transferred, but that causes a communication fault due to a bad transfer quality.

In this case, in order to detect SD, each node measures whether traffic is damaged in real-time, and when both a working path and a protection path are in an SD state, if the node uses a selector bridge, a traffic transmission path may be frequently changed. If a transmission path of traffic is frequently changed, traffic may not be appropriately transferred and thus in order to prevent this, each node of a network may use a permanent bridge or a broadcast bridge.

However, when the node uses the permanent bridge, traffic is always transmitted to the working path and the protection path and thus a network resource or a bandwidth of the path may be wasted. Particularly, in a packet-based network, there is a burden that should use a packet forwarding engine of a high performance for traffic copy.

Further, because the broadcast bridge copies traffic only when a fault occurs at a path, the broadcast bridge is more efficient than the permanent bridge, but when protection switching is performed in a non-reverse mode, a network resource may be still wasted. That is, even after a fault of the path is restored, when the broadcast bridge operates with non-reverse mode of operation method using both the working path and the protection path for traffic transmission, there is a problem that traffic is still copied and a resource of the network is wasted.

SUMMARY OF THE INVENTION

The present invention has been made in an effort to provide a bridge that performs protection switching of a network having advantages of efficiently changing a transmission path of traffic even when protection switching is performed in a non-reverse mode.

An exemplary embodiment of the present invention provides a method of performing protection switching of one node of a plurality of nodes that are connected through a working path and a protection path. The method includes: opening, when a signal failure fault that has occurred at the working path is detected, a first switch that is connected to the working path and closing a second switch that is connected to the protection path; and maintaining, when the node operates in a non-reverse mode, if the signal failure fault is restored, a state of the first switch and a state of the second switch.

The method of claim 1 may further include: closing, when a signal degrade fault that has occurred at the working path or the protection path is detected, the first switch and the second switch.

The method of claim 1 may further include: closing, after the maintaining of a state of the first switch and a state of the second switch, when a preset time has elapsed, the first switch and opening the second switch.

The first switch is closed and the second switch is opened, before the signal failure fault occurs at the working path.

Another embodiment of the present invention provides a protection switching unit that is included in one node of a plurality of nodes that are connected through a working path and a protection path. The protection switching unit includes: a path search unit that detects a path fault that has occurred at the working path and the protection path and restoration of the path fault; a first switch that is connected to the working path; a second switch that is connected to the protection path; and a controller that transfers an open command to the first switch and that transfers a close command to the second switch, when the path search unit detects a signal failure fault that has occurred at the working path and that transfers a state maintenance command to the first switch and the second switch, when the bridge operates in a non-reverse mode, if the signal failure fault is restored.

The controller may transfer a close command to the first switch and the second switch, when the path search unit detects a signal degrade fault that has occurred at the working path or the protection path.

The controller may transfer a close command to the first switch and transfers an open command to the second switch, after the controller transfers a state maintenance command to the first switch and the second switch, when a preset time has elapsed.

The first switch is closed and the second switch is opened, before the signal failure fault occurs at the working path.

DETAILED DESCRIPTION OF THE EMBODIMENTS

Figure 1:
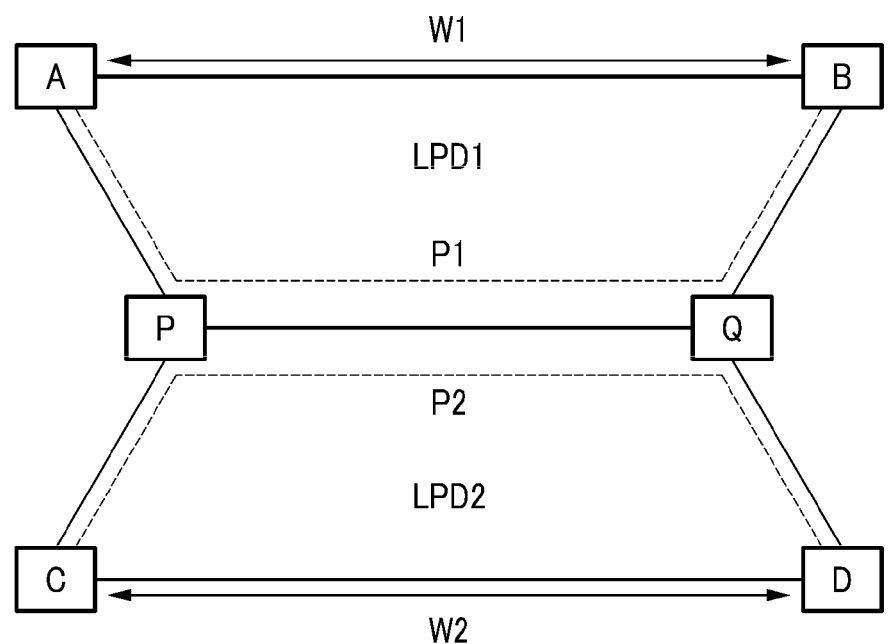
FIG. 1 is a diagram illustrating a network including a plurality of nodes that are connected to a working path and a protection path according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is a diagram illustrating a network including a plurality of nodes that are connected to a working path and a protection path according to an exemplary embodiment of the present invention.

FIG. 1 is a diagram simplifying a network that includes a plurality of working path and protection path, an exemplary embodiment of the present invention may also be applied a network that includes at least one working path and protection path.

Referring to FIG. 1, a pair of end point nodes A and B are connected through a working path W1 and a protection path P1. A pair of end point nodes C and D is connected through a working path W2 and a protection path P2. The working paths W1 and W2 directly connect the pair of end point nodes A and B, and C and D, and the protection paths P1 and P2 connect the pairs of end point nodes A and B, and C and D through nodes P and Q.

A protection switching unit according to an exemplary embodiment of the present invention is included in the end point nodes A, B, C and D and enables traffic to be transmitted through the working path or the protection path.

Figure 2:
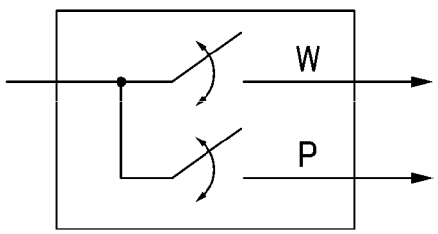
FIG. 2 is a schematic diagram illustrating a protection switching unit according to an exemplary embodiment of the present invention.

FIG. 2 is a schematic diagram illustrating a protection switching unit according to an exemplary embodiment of the present invention.

Referring to FIG. 2, the protection switching unit according to an exemplary embodiment of the present invention is included in an end point node of a network. In the protection switching unit, a switch that enables to transmit traffic or to intercept transmission of traffic to the working path or the protection path is connected to each path.

When both a switch (W) (hereinafter, referred to as a 'first switch') that is connected to the working path and a switch (P) (hereinafter, referred to as a 'second switch') that is connected to the protection path, which are included in the protection switching unit are closed, an equipment (end point equipment or link extension equipment) that includes selective broadcast copies traffic and transmits traffic to both the working path and the protection path.

However, when a fault occurs at one path of two paths, a switch that is connected to a path in which a fault does not occur is closed, and traffic is transmitted through a path in which a fault does not occur.

For example, when a fault occurs at the working path, only a switch that is connected to the protection path may be closed, and a node may not copy traffic and transmit traffic using the protection path. Therefore, a protection switching method according to an exemplary embodiment of the present invention is more excellent than a protection switching method of permanent bridge.

A protection switching method according to an exemplary embodiment of the present invention is performed by a selective broadcast bridge, a bridge performing the protection switching method according to an exemplary embodiment of the present invention may be considered as the equivalent of the selective broadcast bridge.

Hereinafter, operation of a selective broadcast bridge will be described with reference to FIG. 3 and Table 1.

Figure 3:
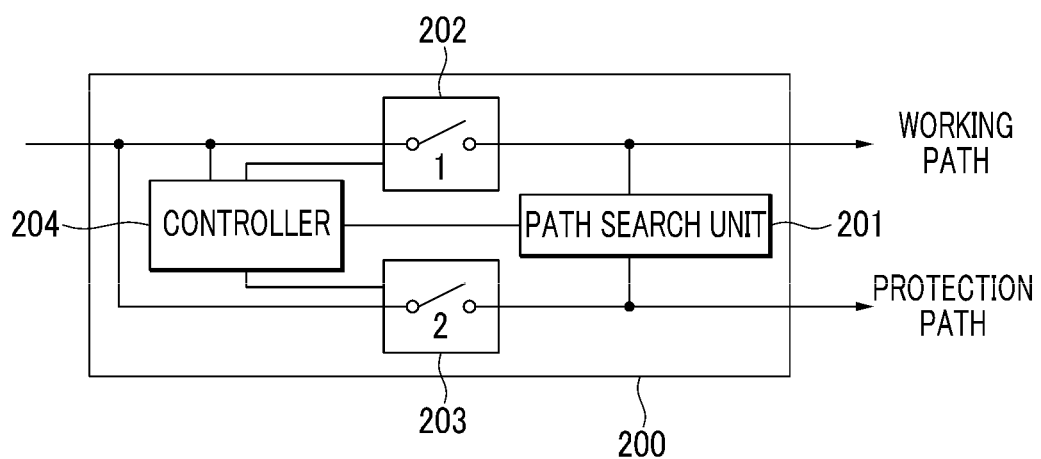
FIG. 3 is a block diagram illustrating a selective broadcast bridge according to an exemplary embodiment of the present invention.

FIG. 3 is a block diagram illustrating a selective broadcast bridge according to an exemplary embodiment of the present invention.

Referring to FIG. 3, a selective broadcast bridge 200 according to an exemplary embodiment of the present invention includes a path search unit 201, a first switch 202, a second switch 203, and a controller 204.

The path search unit 201 detects a fault that occurs at a working path or a protection path. In this case, a fault that may occur at each path includes SF and SD. Further, the path search unit 201 detects restoration of a fault of the working path or the protection path. When a fault occurs at the working path or the protection path or when a fault that has occurred is restored, the path search unit 201 reports a state thereof to the controller 204.

The first switch 202 is connected to the working path to perform an opening and closing operation of the switch according to an instruction of the controller 204. The second switch 203 is connected to the protection path to perform an opening and closing operation of the switch according to an instruction of the controller 204.

The controller 204 controls the first switch 202 and the second switch 203 according to a state of the working path and the protection path that are detected by the path search unit 201. Operation of the controller 204 according to a path fault type and an application situation thereof will be described with reference to Table 1.

Table 1 classifies operation of the selective broadcast bridge 200 according to an exemplary embodiment of the present invention on a fault type and application situation basis.

TABLE 1

| Working path switch (first switch) | Protection path switch (second switch) | Application situation |
|---|---|---|
| Close | Open | Normal state<br>SF fault of protection path<br>Operator instruction |
| Open | Close | SF fault of working path<br>After SF and SD faults of working path are restored in non-reverse mode<br>Operator instruction |
| Close | Close | SD fault of working path or protection path |

Referring to Table 1, in a normal state in which a fault does not occur at any path, only the first switch 202 is closed, and thus traffic is transmitted to only the working path. Further, when an SF fault occurs at the protection path or when an instruction of an operator exists, only the first switch 202 is closed.

Thereafter, when the path search unit 201 detects that an SF fault has occurred at the working path, the controller 204 transfers an open command to the first switch 202 and transfers a close command to the second switch 203. That is, in this case, traffic is transmitted to only the protection path.

When the path search unit 201 detects that an SD fault has occurred at the working path, the controller 204 transfers a close command to the second switch 203. That is, in this case, traffic is transmitted to both the protection path and the working path.

When the selective broadcast bridge 200 according to an exemplary embodiment of the present invention operates in a reverse mode, if the path search unit 201 detects that an SF fault of the working path is restored, the controller 204 transfers an open command to the second switch 203 and transfers a close command to the first switch 202. Therefore, when protection switching is performed in a reverse mode, the selective broadcast bridge 200 can operate like a common broadcast bridge.

In this case, although the path search unit 201 detects that an SF fault of the working path is restored, the controller 204 transfers respectively an open and close command to the second switch 203 and the first switch 202 after a preset time has elapsed. Generally, the preset time is called wait-to-restore (WTR) time, and may be set to prevent unnecessary switching between a working path and protection path when a fault of the path is frequently occurred and restored.

However, when the selective broadcast bridge operates in a non-reverse mode, if the path search unit 201 detects that an SF fault of the working path is restored, the controller 204 transfers an open command to the first switch 202, and a closed state of only the second switch 203 is maintained and thus traffic is transmitted to only the protection path. The selective broadcast bridge 200 is better than a common broadcast bridge in this point.

That is, when an SF fault that has occurred at a working path is restored in a non-reverse mode, a common broadcast bridge doesn't restore a state of all switches that are included in the bridge and thus there is a problem that traffic is transmitted to a protection path.

Further, when protection switching is performed in a non-reverse mode, even if an SD fault of the working path is restored or even if an instruction of an operator exists, only the second switch 203 is closed, and traffic is transmitted to the protection path.

Further, when an SD fault occurs at the working path or the protection path, both the first switch 202 and the second switch 203 are closed and thus traffic is transmitted to both paths. That is, only in this case, because traffic is copied, a waste of resources of the network can be reduced.

When each fault situation in Table 1 is an operation in a reverse mode, it is assumed that an activation period of a path fault wait-to-restore (WTR) timer is a period of a fault state.

The selective broadcast bridge 200 according to an exemplary embodiment of the present invention may be embodied with hardware or software.

As described above, by using a selective broadcast bridge according to an exemplary embodiment of the present invention, when a path fault occurs, a traffic transmission path can be prevented from frequently changing. Further, even when the bridge operates in a non-reverse mode, traffic can be transmitted to only one path. Therefore, when using a selective broadcast bridge according to an exemplary embodiment of the present invention, a network resource such as a bandwidth of a path can be efficiently used.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of performing protection switching in a network at an end node connected to another end node through a working path and a protection path, the method comprising:
    copying traffic and closing a first switch that is connected to the working path and a second switch that is connected to the protection path when a signal degrade fault has occurred on either the working path or the protection path so that the traffic is transmitted through both the working path and the protection path; and
    stopping the copying of the traffic in a non-revertive mode when the signal degrade fault is restored.

2. The method of claim 1 wherein the stopping includes maintaining a state of the second switch and opening the first switch when the signal degrade fault on the working path is restored.

3. The method of claim 1, further comprising:
    opening the first switch and closing the second switch when a signal failure fault on the working path or an instruction of an operator to use the protection path is detected; and switching the traffic from the working path to the protection path.

4. The method of claim 1, further comprising:
closing the first switch and opening the second switch when a signal failure fault on the protection path or an instruction of an operator to use the working path is detected; and
transmitting the traffic through the working path.

5. A method of performing protection switching in a network at an end node connected to another end node through a working path and a protection path, the method comprising:
copying traffic and closing a first switch that is connected to the working path and a second switch that is connected to the protection path when a signal degrade fault has occurred on either the working path or the protection path so that the traffic is transmitted through both the working path and the protection path;
maintaining a state of the first switch and a state of the second switch in a wait to restore (WTR) state in a revertive mode; and
stopping the copying of the traffic in the revertive-mode when the WTR state has elapsed.

6. The method of claim 5 wherein the stopping includes closing the first switch and opening the second switch when the WTR state has elapsed.

7. The method of claim 5, further comprising:
opening the first switch and closing the second switch when a signal failure fault on the working path or an instruction of an operator to use the protection path is detected; and
switching the traffic from the working path to the protection path.

8. The method of claim 5, further comprising:
closing the first switch and opening the second switch when a signal failure fault on the protection path or an instruction of an operator to use the working path is detected; and
transmitting the traffic through the working path.

9. A protection switching unit that is included in one end node connected to another end node through a working path and a protection path, the protection switching unit comprising:

a path search unit that is able to detect a signal degrade fault that has occurred on either of the working path and the protection path and a restoration of the signal degrade fault;
a first switch that is connected to the working path;
a second switch that is connected to the protection path; and
a controller that:
copies traffic,
transfers a close command to the first switch and the second switch when the path search unit detects a signal degrade fault on either the working path or the protection path so that the traffic is transmitted through both the working path and the protection path, and
stops copying the traffic in a non-revertive mode when the signal degrade fault is restored.

10. The protection switching unit of claim 9 wherein the controller maintains a state of the second switch and opens the first switch when the signal degrade fault on the working path is restored.

11. The protection switching unit of claim 9 wherein the controller opens the first switch and closes the second switch when a signal failure fault on the working path or an instruction of an operator to use the protection path is detected and switches the traffic from the working path to the protection path.

12. The protection switching unit of claim 9 wherein the controller closes the first switch and opens the second switch when a signal failure fault on the protection path or an instruction of an operator to use the working path is detected and transmits the traffic through the working path.

13. The protection switching unit of claim 9 wherein the controller maintains a state of the first switch and a state of the second switch in a wait to restore (WTR) state in a revertive mode and stops copying the traffic in the revertive-mode when the WTR state has elapsed.

14. The protection switching unit of claim 13 wherein the controller closes the first switch and opens the second switch when the WTR state has elapsed.

* * * * *